United States Patent
Solar

(10) Patent No.: US 11,613,308 B2
(45) Date of Patent: Mar. 28, 2023

(54) VEHICULAR LIGHTING SYSTEM USING LIGHT PROJECTIONS

(71) Applicant: MAGNA ELECTRONICS INC., Auburn Hills, MI (US)

(72) Inventor: Martin Solar, Erlenbach (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 126 days.

(21) Appl. No.: 16/694,497

(22) Filed: Nov. 25, 2019

(65) Prior Publication Data

US 2020/0086918 A1 Mar. 19, 2020

Related U.S. Application Data

(63) Continuation of application No. 15/661,451, filed on Jul. 27, 2017, now Pat. No. 10,486,742.

(Continued)

(51) Int. Cl.
*B60R 1/00* (2022.01)
*B60Q 9/00* (2006.01)
(Continued)

(52) U.S. Cl.
CPC .......... *B62D 15/028* (2013.01); *B60Q 1/24* (2013.01); *B60Q 1/48* (2013.01); *B60Q 9/007* (2013.01); *B60R 1/00* (2013.01); *B62D 15/0275* (2013.01); *G01S 7/04* (2013.01); *G01S 7/51* (2013.01); *G01S 13/931* (2013.01); *G01S 17/931* (2020.01); *G06T 7/70* (2017.01);
(Continued)

(58) Field of Classification Search
CPC ........ B60R 2300/205; B60R 2300/301; B60R 2300/806; G06T 7/90; G06T 7/70; G06T 7/73; G06T 2207/10024; G01S 7/04; G01S 7/51; G01S 13/931; G01S 2013/9314; G01S 2013/9317; G06K 9/00805; G06K 9/00812
USPC .......... 382/103–104, 106–107, 100; 701/96, 701/492
See application file for complete search history.

(56) References Cited

U.S. PATENT DOCUMENTS 5,550,677 A 8/1996 Schofield et al.
5,574,426 A * 11/1996 Shisgal .................. G01S 15/931
340/904

(Continued)

OTHER PUBLICATIONS

T. Féret, P. Chandrashekhariah and N. Trujillo, "Real-time Parking Slot Detection for Camera-equipped Vehicles," 2019 IEEE Intelligent Transportation Systems Conference (ITSC), 2019, pp. 4107-4114, doi: 10.1109/ITSC.2019.8917060. (Year: 2019).*

*Primary Examiner* — Andrew M Moyer
*Assistant Examiner* — Stephen M Brinich
(74) *Attorney, Agent, or Firm* — Honigman LLP

(57) ABSTRACT

A vehicular lighting system includes a light projecting device disposed at each headlight of a vehicle. The light projecting device is part of the respective headlight. The light projecting device, when operated, projects an animated sequence of visual images or a sequence of visual light patterns on a wall in front of the vehicle. The projected animated sequence of visual images or projected sequence of visual light patterns is viewable at the wall by a driver of the vehicle. The light projecting device may include a matrix of light emitting diodes. The visual images or visual light pattern projected by the light projecting device, when operated, may change as distance between the vehicle and the wall decreases.

23 Claims, 5 Drawing Sheets

Related U.S. Application Data

(60) Provisional application No. 62/369,347, filed on Aug. 1, 2016.

(51) Int. Cl.

| | | |
|---|---|---|
| *G06T 7/70* | (2017.01) | |
| *G01S 13/931* | (2020.01) | |
| *B60Q 1/48* | (2006.01) | |
| *G01S 17/931* | (2020.01) | |
| *G01S 15/931* | (2020.01) | |
| *B62D 15/02* | (2006.01) | |
| *B60Q 1/24* | (2006.01) | |
| *G06T 7/90* | (2017.01) | |
| *G01S 7/51* | (2006.01) | |
| *G01S 7/04* | (2006.01) | |
| *G06V 20/58* | (2022.01) | |

(52) U.S. Cl.
CPC ............... *G06T 7/90* (2017.01); *G06V 20/58* (2022.01); *B60Q 2400/50* (2013.01); *B60R 2300/205* (2013.01); *B60R 2300/301* (2013.01); *B60R 2300/806* (2013.01); *G01S 15/931* (2013.01); *G01S 2013/9314* (2013.01); *G01S 2015/932* (2013.01); *G06T 2207/10024* (2013.01); *G06T 2207/30261* (2013.01)

(56) References Cited

U.S. PATENT DOCUMENTS

| | | | |
|---|---|---|---|
| 5,623,334 A | 4/1997 | Cho et al. | |
| 5,670,935 A | 9/1997 | Schofield et al. | |
| 5,949,331 A | 9/1999 | Schofield et al. | |
| 6,281,806 B1 | 8/2001 | Smith et al. | |
| 6,429,420 B1 | 8/2002 | Babst et al. | |
| 6,690,268 B2 | 2/2004 | Schofield et al. | |
| 6,693,517 B2 | 2/2004 | McCarthy et al. | |
| 7,580,795 B2 | 8/2009 | McCarthy et al. | |
| 7,914,187 B2 | 3/2011 | Higgins-Luthman et al. | |
| 8,874,317 B2 | 10/2014 | Marczok et al. | |
| 10,082,562 B1 | 9/2018 | Abari et al. | |
| 10,156,636 B1 | 12/2018 | Minorics | |
| 10,486,742 B2 | 11/2019 | Solar | |
| 2001/0018640 A1 | 8/2001 | Matsunaga | |
| 2003/0201878 A1 | 10/2003 | Bai et al. | |
| 2005/0159876 A1 | 7/2005 | Sugano | |
| 2005/0259033 A1 | 11/2005 | Levine | |
| 2007/0154068 A1 | 7/2007 | Stein et al. | |
| 2010/0033348 A1 | 2/2010 | Kawabata et al. | |
| 2012/0062743 A1 | 3/2012 | Lynam et al. | |
| 2012/0069185 A1* | 3/2012 | Stein | G06T 7/248 348/148 |
| 2012/0109454 A1* | 5/2012 | Fischer | B60Q 1/484 701/36 |
| 2012/0218412 A1 | 8/2012 | Dellantoni et al. | |
| 2013/0222592 A1 | 8/2013 | Gieseke | |
| 2014/0121883 A1 | 5/2014 | Shen et al. | |
| 2014/0168630 A1 | 6/2014 | Iida et al. | |
| 2014/0218529 A1 | 8/2014 | Mahmoud et al. | |
| 2014/0244070 A1* | 8/2014 | Inagaki | B62D 15/0285 701/1 |
| 2014/0375476 A1 | 12/2014 | Johnson et al. | |
| 2015/0097704 A1* | 4/2015 | Kwon | G01S 7/4808 340/932.2 |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0344028 A1 | 12/2015 | Gieseke et al. | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2017/0015312 A1 | 1/2017 | Latotzki | |
| 2017/0017847 A1 | 1/2017 | Nakaya | |
| 2017/0050672 A1 | 2/2017 | Gieseke et al. | |
| 2017/0253237 A1 | 9/2017 | Diessner | |
| 2017/0317748 A1 | 11/2017 | Krapf | |
| 2017/0329346 A1 | 11/2017 | Latotzki | |
| 2018/0004020 A1* | 1/2018 | Kunii | B60Q 1/34 |
| 2018/0264944 A1* | 9/2018 | Torii | G02B 27/0101 |

\* cited by examiner

VEHICULAR LIGHTING SYSTEM USING LIGHT PROJECTIONS

CROSS REFERENCE TO RELATED APPLICATIONS

The present application is a continuation of U.S. patent application Ser. No. 15/661,451, filed Jul. 27, 2017, now U.S. Pat. No. 10,486,742, which claims the filing benefits of U.S. provisional application Ser. No. 62/369,347, filed Aug. 1, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that utilizes one or more cameras to capture image data representative of images exterior of the vehicle, and provides display of captured video images to assist a person (such as the driver of the vehicle or such as a person supervising an autonomous or semi-autonomous driving maneuver) during a reversing or parking maneuver of the vehicle. The system includes a light projecting device at the vehicle and operable to project an alert or visual pattern toward an area encompassed by the field of view of the camera. During a parking maneuver of the vehicle, and responsive to determination, via image processing by said image processor of captured image data, that the vehicle is approaching a wall or object, the parking assist system controls the light projecting device to project the alert or visual pattern onto the determined wall or object. The projected alert is viewable at the determined wall or object by a driver of the vehicle during the parking maneuver, and the projected alert is indicative of distance between the vehicle and the determined wall or object (where the distance may be determine by a distance measuring device of the vehicle, such as a RADAR sensing system of the vehicle, a LIDAR sensing system of the vehicle or an ultrasonic sensing system of the vehicle or the like).

Optionally, the system may project a light pattern or icons or indicia or colors onto objects, walls or the ground to provide to the person or driver of the vehicle information pertaining to a determined object of interest (that may be in or moving into the path of travel of the vehicle during the reversing or parking maneuver). The projected light pattern may be adjusted to provide a desired or appropriate pattern or icon or indicia, or the color of the light pattern may be adjusted to provide the desired appearance of the images displayed to the person or driver (images captured by a camera of the vehicle that has a field of view exterior of the vehicle that encompasses the area or object at which the light pattern is projected).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
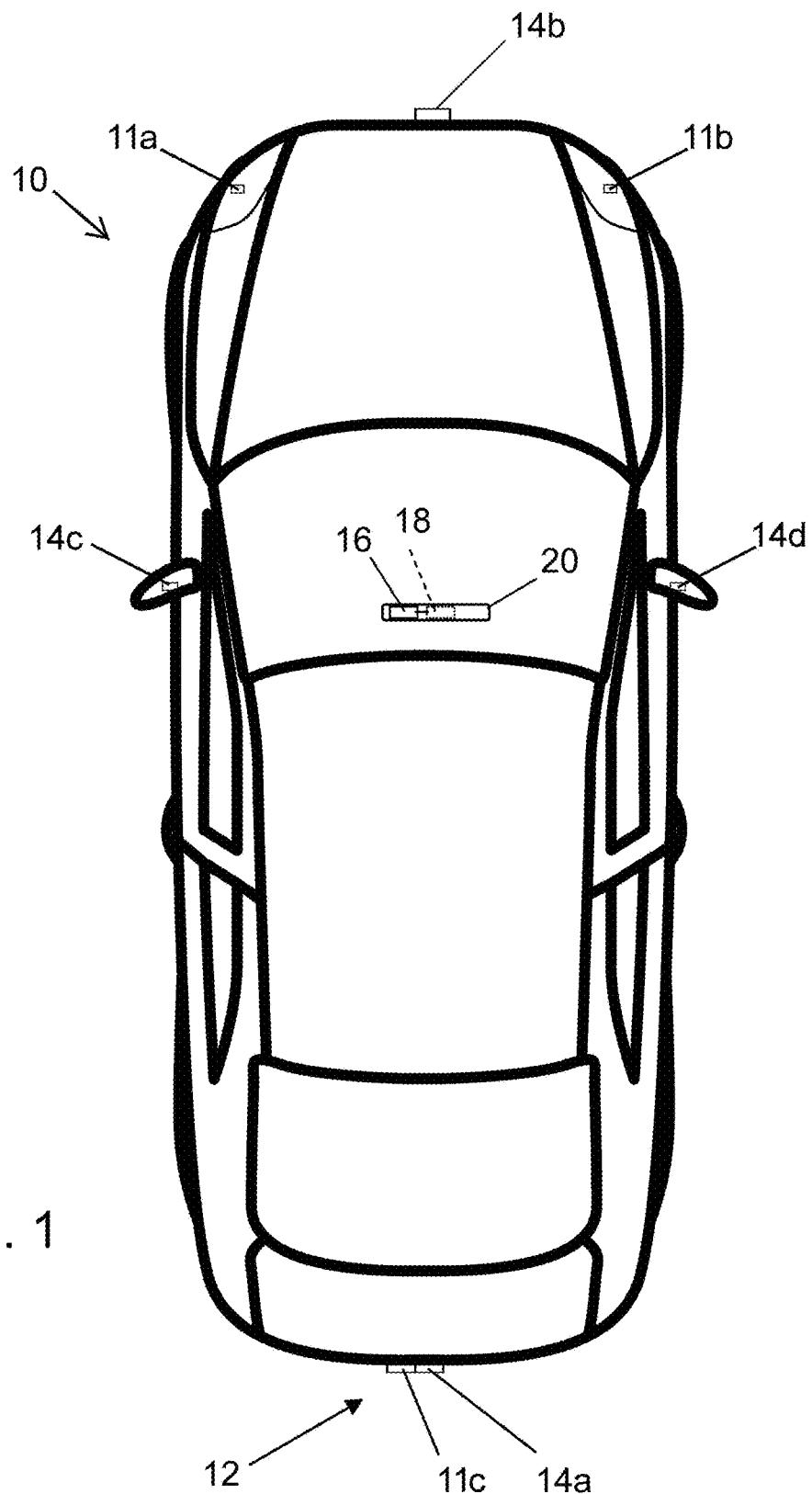
FIG. 1 is a plan view of a vehicle with a driving assist system that incorporates cameras and light projecting devices in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The system includes at least one projection device 11c (such as a rearward projecting projection device at the rear of the vehicle). The system may include additional projection devices 11a and 11b (such as forward projecting projection devices at the front of the vehicle), which may be integrated into the headlamp structure. The projection devices 11a, 11b and 11c may also incorporate a light emitting and ranging (LIDAR) or scanning function. The projection and Lidar function may be performed or controlled by an additional ECU or by the vision system's ECU 18.

Parking aid system human-machine interfaces (HMIs) are known. Some indicate acoustically the distance to a possible collision or hazardous object in the path of vehicle travel by modulating a beep or tone sequence. Some have displays showing the distance to possible collision or hazardous object in colored bars at an in-cabin display. Some combine the displaying of bars with a real time vehicle environment image typically by overlaying (augmenting) the colored aids with the displayed real time video images. Some systems show the real time vehicle environment image scene as top view scene images. The real time vehicle environment images may come from vehicle inherent cameras, such as rear cameras or multiple surround vision system cameras or the like, or the real time vehicle environment images may comprise images transmitted from an outside structure or another vehicle by any suitable communication system, such as a V2V (vehicle-to-vehicle) or V2X (vehicle-to-infrastructure) or the like, or via an analog signal channel such as NTSC or the like. Some vehicle image processing systems are operable to determine the presence of possible or potentially hazardous objects (that may be in a projected or predicted path of travel of the equipped vehicle or may be moving towards or into the projected path of travel of the equipped vehicle, such that there is a potential collision with the determined object) by image processing (of image data captured by one or more RGB or infrared (IR) cameras), and some detect objects and the environmental scene by using LIDAR sensing systems, which either detect the environment using structured light (including fringe light pattern or color pattern) or time of flight (TOF) systems (flash type or scanning type), and some detect objects and the environmental scene by using non-vision sensors such as ultrasound or RADAR sensing systems.

A vehicle may include light bulb, LED and/or LASER light sources mounted to illuminate the outside to project a light pattern to nearby structures, walls or the ground outside and at or around the vehicle. Often the light used for machine vision systems is in non-visual wavelengths such as IR.

Figure 2:
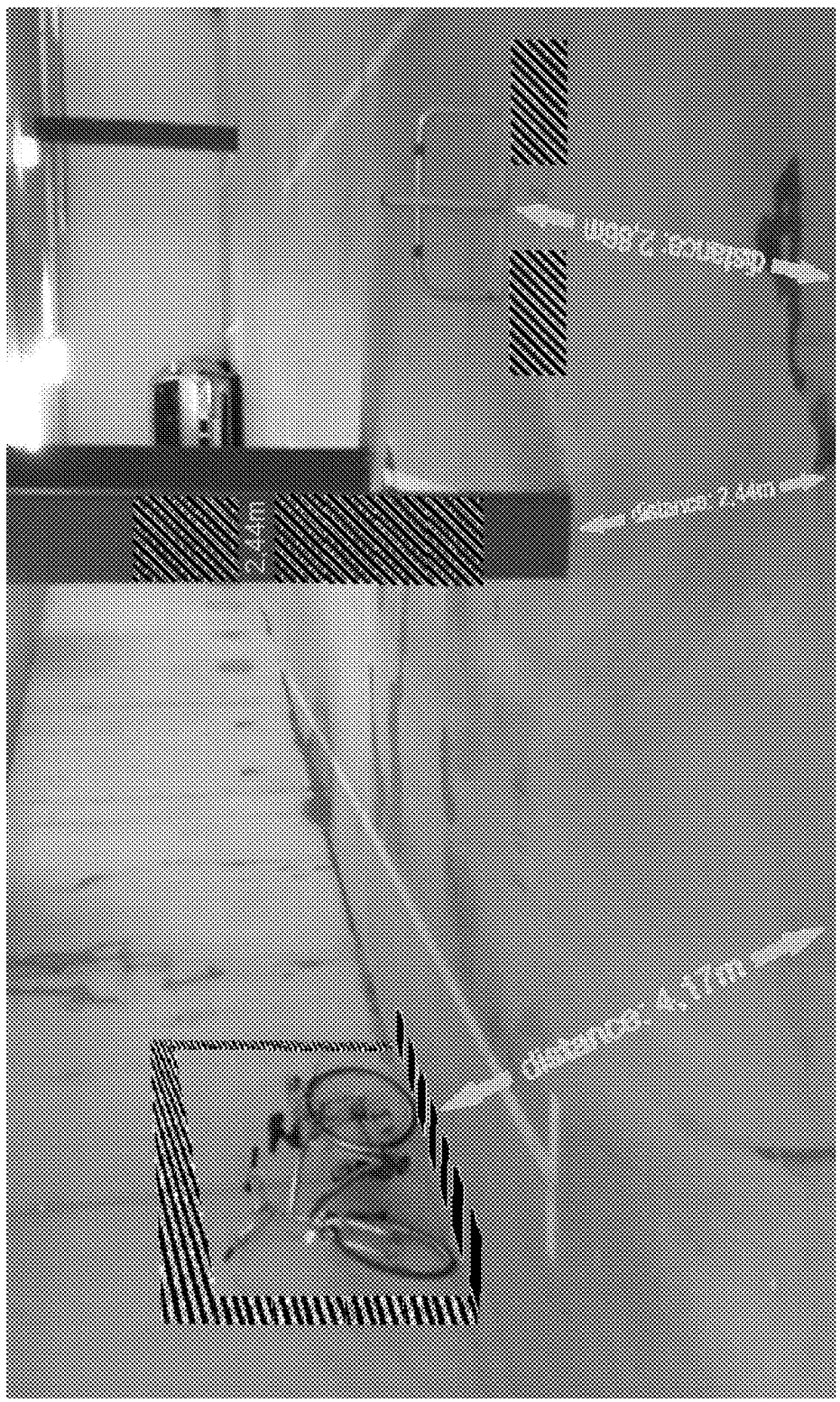
FIG. 2 shows a parking space scene within a parking structure such as seen from the rear of a vehicle when parking, with distance markings and arrows (colored, such as yellow) projected onto the ground and with collision hazard highlighting (in form of colored hatches, such as red cross-hatching) projected around, at and in front of detected or determined collision objects.

The present invention provides a parking assist system that utilizes light sources to assist in highlighting objects determined to be present in the field of view of a camera of the vehicle and determined to be an object of interest to the driver of the vehicle, such as during a parking maneuver of the vehicle, such as shown in the example of FIG. 2. When parking a vehicle within a dense structure, the remaining distance to nearby detected collision hazard objects may be projected onto the (real) objects, close walls or onto the ground by vehicle inherent light sources, such as projectors (such as, for example, LCD projectors, DLP projectors, LED projectors, LCoS projectors or LASER projectors) or such as by (standalone) LASERS, which may be directed by a rotating or moving mirror or microelectromechanical (MEM) systems (for example a MEM mirror oscillating (or scanning) in two axis), OLED or LED matrix beams, or such as by mechanically adjusted lamp's beams.

The projected aids may comprise characters, bars or arrows or other indicia or icons or the like (see FIGS. 2-5). The projections may optionally have animated film-sequences or images in sequence. Instead of the visual aids being overlayed on displayed images, the distance indicator may, for example, comprise a light projection in a shape of a fan or curtain which continuously shuts or closes up the more narrow a collision hazardous object gets to the vehicle, optionally indicating the nearest potential collision or hazardous object. A visualization of the distance by bar indicators of different height and being more and more filled with closing distance is familiar from display based visualizations. The distance between the vehicle and the determined object (or wall or structure) may be determined via a distance sensing device or system of the vehicle, such as a RADAR sensing system or an Ultrasonic sensing system or a LIDAR sensing system or a vision based sensing system or the like.

Figure 3:
FIG. 3 shows a frontal distance bar projection onto a wall at a moderate distance as it would be visible from overtop the vehicle, shown with two bars filled.
Figure 4:
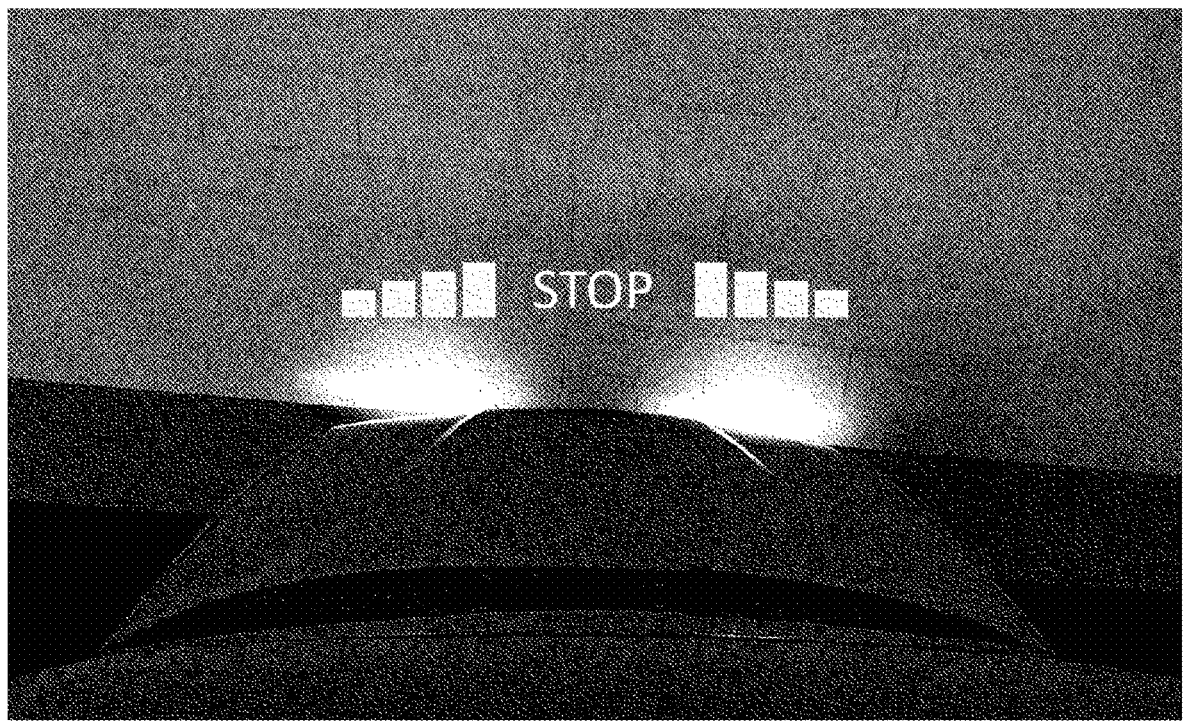
FIG. 4 shows a frontal distance bar plus a 'STOP' text projection onto a wall at a close distance as it would be visible from overtop the vehicle, shown with all of the bars filled.
Figure 5:
FIG. 5 is another view of the frontal distance bar and 'STOP' text projection onto the wall in front of the vehicle at a close distance (with all of the bars filled), as it would be visible from in the vehicle cabin (no head up overlay).

For example, a solution with such bars, but being projected by the system according the invention is shown in FIGS. 3-5. FIGS. 4 and 5 may be in sequence to FIG. 3. The projected alert comprises a plurality of vertically-oriented bars, with the bars projected as "empty" or "filled" depending on the distance of the vehicle from the determined wall (or object). For example, when at a first threshold distance from the wall, only the shortest bar (or bars) may be filled, with the next taller bars being progressively filled as the vehicle further approaches the wall (and moves to be within a second threshold distance and then a third threshold distance, etc.). The vehicle's clearance to the detected wall is diminished in FIGS. 4 and 5 (as compared to FIG. 3), and thus more bars are filled in FIGS. 4 and 5 (as compared to FIG. 3). When the vehicle is within a smallest threshold distance, the projected alert may include a "stop" alert (see FIGS. 4 and 5) that indicates to the driver of the vehicle that the vehicle is very close to the determined wall (or object) and should be stopped to avoid impact with the wall or object. The stop alert may be projected after the tallest bar (or bars) are filled or at the same time that the tallest bar (or bars) are filled. In the illustrated embodiment, the stop alert is disposed between two spaced apart sets of bars (arranged in a staircase manner with the tallest bars toward the center or stop alert and the shorter bars laterally outboard of the tallest bars and stop alert).

Modern vehicle parking assist systems allow the driver to leave the vehicle and supervise the parking maneuver, which is executed automatically by the vehicle. The supervising may be done using a smart phone. In some systems, the vehicle transmits a top view (or bird's eye view) composed out of typically four individual vehicle cameras' images to the smart phone. Potentially detected collision hazards are highlighted in the smart phone top view image. Since it us comparably inconvenient to supervise the vehicle's rear maneuvering while looking at a smart phone display, the solution of the present invention to project the maneuvering aids into the real scene is advantageous. FIGS. 3 and 4 show exemplary parking scenes as seen by a person outside the vehicle, while FIG. 5 shows an exemplary parking scene as seen by a person (such as a driver or occupant of the vehicle) inside the vehicle.

Typical for smart phone autonomous parking aids is that the vehicle is enabled to move (or act) autonomously as long as the driver holds a button on the smart phone. To make the smart phone fully obsolete, the autonomous parking/driving/acting approval may optionally be solved by projecting an icon or button on the ground. The driver (or anybody else responsible) may have to step into the projection for releasing the vehicle to move. The release may be discontinued when the driver steps out of the projected icon or button. Optionally, the driver may be identified by an optional identification system which may optionally be visual based, or may comprise any vehicle sensor, or may comprise a keyless entry go key (or fob) based, or may comprise a smart phone localization in the driver's pocket (such as near field-based, WiFi-based, UMTS-based, optical-based or sound-based).

Projection solutions for forward driving applications especially for autonomous driving, such as forward path and lane highlighting or visual interaction with crossing pedestrians, may be implemented.

From top view and rear view parking aid vehicle or smart phone displaying system solutions, visual parking and hazard highlighting aids may be overlayed on the displayed images in any desired color, and the distance indicators may change color or blink as the vehicle moves closer to a potential collision hazardous object. In accordance with the system of the present invention, the aids or icons or the like may be instead or additionally projected onto outside objects, walls or towards the ground (so as to be within the field of view of the camera or cameras such that captured image data and the video images displayed therefrom match the projected color pattern). Optionally, the color of the projected aids may change according to the color of the ground, walls or the object's surface color (for example, if the object or wall or ground is a color other than yellow, the color of the projected aid may be yellow, but if the object or wall or ground is yellow, the color of the projected aid may be red or blue or other non-yellow).

Optionally, the system may have at least one camera, such as a rear camera, to capture image data representative of the vehicle's environment. Optionally, the camera may be used also or just for detecting the surrounding scene, walls and collision object's light intensity and color reflection, its patterns and/or the object's texture or roughness for being reflected in the projection control.

Optionally, the system's control may adapt the color and light beam pattern in a way so that the projected parking aid appears in a preferred manner. Optionally, it may be preferred that the parking aid projection appears substantially homogeneous also at the ground's surface or object's surface, which may have an inhomogeneous color pattern. Optionally, it may be preferred that the parking aid projection appears substantially in a well color and/or (reflected) light intensity contrast to its underground or background. The adaption may be made by considering the resulting (reflecting) light intensity and color spectrum when an object body is subtractively absorbing the light intensity of certain color spectrums of its according color (or area with that color) together with the color spectrum of the light source which acts additive to the visual appearing color mix. By controlling the light source color in specifically desired areas of the light beam for the visual aid, the resulting color can be controlled (for a certain instance due to the limited color intensity range of the light source).

Optionally, it may be preferred that the parking aid projection appears most color intense or most bright on the objects of the most interest, such as, for example, at a parking space that is best or preferred in one of convenience, safety, parking fee, vehicle wear (taking into account weather conditions, since a parking deck on the structures top may be exposed to sun, rain and snow), parking maximum time, available or best service (e.g., electric vehicle charging service, parking guard service, carry home service or such like), on the nearest object, or the fastest moving object, or the most hazardous object or the like.

Optionally, the projection system may comprise a two axis (two dimensional or 2D) MEM mirror paired with a LED or LEDs or LASER or LASERS that emits light in one or more colors. Optionally, the projection device(s) is/are paired with one or multiple environmental scene detection devices, such as a LASER scanning LIDAR. Optionally, the projection device(s) and optional multiple environmental scene detection device(s) is/are paired with one or more illumination devices, such as vehicle headlamps or search lights or coming home lights or tail lights. Optionally, the paired systems may use or occupy one common or multiple common assembly space(s) at the vehicle, such as the vehicle's head light assembly. Optionally, the paired systems may use one common or multiple common MEM mirror(s) for emitting or receiving light. Optionally, the paired systems may use invisible wavelengths, such as infrared (IR) or ultraviolet (UV), for environmental scene detection (optionally multi-spectrum/channel) and visible wavelengths for driver/user information projections. Optionally, the scanning system is operable to analyze the scene objects or ground spectrum for acquiring additional scene properties. Optionally, the system may be fused with a RADAR sensing system.

Optionally, the scanning system (with camera or LIDAR) may incorporate or comprise a light communication functionality (VLC), such as by utilizing aspects of the systems described in U.S. patent application Ser. No. 15/583,112, filed May 1, 2017, and published on Nov. 2, 2017 as U.S. Patent Publication No. US-2017-0317748, which is hereby incorporated herein by reference in its entirety. Optionally, the VLC may span a grid from peer to peer, which may comprise multiple active or optionally also parked vehicles and optionally an infrastructure peer. The infrastructure peer may be connected to the internet and may be incorporated at the parking structure. Optionally, the infrastructure may have projection units installed as well which are optionally paired with the VLC capable illumination devices. These may also project driving and parking aids to approaching vehicles and pedestrians. Optionally, parking structures may guide incoming vehicles to free parking spaces or leaving vehicles out of the building by using guiding projections (path bars, arrows, icons) and/or VLC.

Optionally, the scanning system with camera or LIDAR may incorporate or comprise a functionality to detect tags attached to the ground or walls of a parking structure, tunnel or outside for GPS redundant precise ego positioning or object identification, such as described in U.S. patent application Ser. No. 15/583,112, incorporated above.

Optionally, the system according to the present invention, especially the collision hazard detection system, may be combined with a door opening, hatch or trunk lid collision avoidance control system such as described in U.S. Publication No. US-2014-0218529, which is hereby incorporated herein by reference in its entirety. In there the use of structured light was suggested. The laser projector of the present invention may find additional use for such an application by optionally first projecting structured light for scene detection when a door, hatch or trunk lid is opening, and second projecting warning hazards (e.g., projected bars), limiting object distances (e.g., projecting the remaining space in centimeters) or illuminating hazard objects (e.g., to allow the user the possibility to remove an object that is within the prospected path of an opening sweep, such as a bicycle standing next to a vehicle that has doors that are to be opened automatically).

Optionally, the vehicle projection control system of the present invention may be extendable to additional projection units which get attached to the vehicle, such as projection units mounted at a coupled or decoupled trailer connected to the vehicle system by wire or connected wirelessly. The projector on the trailer may project driving aids as well and may optionally also have a distance detection function (scanning). This may be beneficial when a trailer gets parked in a parking space, especially when the trailer parking is fully automated or partially automated.

Optionally, and as another aspect of the present invention, the system may also work when the vehicle is parked, and optionally in a controlled manner in terms of power consumption. Optionally, and especially when the vehicle is an electric vehicle (which may have a separate charging device plugged in), the environmental scanning and light projection may be used to aid foreign or other vehicles, cyclists, motorcycles and pedestrian by illuminating the scene and to aid in collision hazard situations. For example, the system may provide assistance when pedestrians hidden by parked cars are approaching an area with traffic by detecting the presence and path of the pedestrian(s) and by projecting hazard warnings and by transmitting their position and direction (and optionally the predicted path) via VLC or radio V2X or V2V to other traffic participants (optionally within a parking structure). The pedestrian detection and the transmission (of any kind) of their position and walking path when the ego vehicle is parked may utilize aspects of the systems described in U.S. publication No. US-2014-0218529, which is hereby incorporated herein by reference in its entirety.

Optionally, the system according to the present invention may provide assistance by illuminating and projecting rescue or escape paths to escape rooms or escape doors when the vehicle is parked or driven in case of an emergency or seeking rescue or an escape situation such as a fire, flood, avalanche, earthquake, tornado, pyroclastic flow, volcano outbreak, building collapse, hazardous nuclear-, bio- or gas-contamination, rage, panic, violence, criminal, terrorist or war attack (emergency and structure information via V2V or X2V). Optionally, the system may also aid police-, military-, ambulance- or fireman/woman to assist endangered civilians, such as for rescuing civilians, capturing criminals or distinguishing a fire, especially when structures are filled with dense smoke.

The system may utilize aspects of the parking assist systems described in U.S. Pat. No. 8,874,317 and/or U.S. Publication Nos. US-2017-0050672; US-2017-0017847; US-2017-0015312 and/or US-2015-0344028 and/or U.S. patent application Ser. No. 15/586,605, filed May 4, 2017, and published on Nov. 16, 2017 as U.S. Patent Publication No. US-2017-0329346, and/or Ser. No. 15/446,218, filed Mar. 1, 2017, and published on Sep. 7, 2017 as U.S. Patent Publication No. US-2017-0253237, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390;

9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular lighting system, said vehicular lighting system comprising:
   a light projecting device disposed at each headlight of a vehicle equipped with said vehicular lighting system;
   wherein said light projecting device is part of the respective headlight;
   wherein said light projecting device, when operated, projects an animated sequence of visual images on a wall in front of the vehicle;
   wherein the projected animated sequence of visual images is viewable at the wall by a driver of the vehicle;
   wherein presence of the wall in front of the vehicle is determined at least in part responsive to processing, via an image processor, of image data captured by a camera disposed at the vehicle and having a field of view forward of the vehicle; and
   wherein said light projecting device is operated during a parking maneuver of the vehicle and responsive to determination, via image processing by the image processor of captured image data, that the vehicle is approaching the determined wall in front of the vehicle.

2. A vehicular lighting system, said vehicular lighting system comprising:
   a light projecting device disposed at each headlight of a vehicle equipped with said vehicular lighting system;
   wherein said light projecting device is part of the respective headlight;
   wherein said light projecting device, when operated, projects an animated sequence of visual images on a wall in front of the vehicle;
   wherein the projected animated sequence of visual images is viewable at the wall by a driver of the vehicle;
   wherein presence of the wall in front of the vehicle is determined at least in part responsive to processing, via an image processor, of image data captured by a camera disposed at the vehicle and having a field of view forward of the vehicle;
   wherein said light projecting device is operated during a parking maneuver of the vehicle and responsive to determination, via image processing by the image processor of captured image data, that the vehicle is approaching the determined wall in front of the vehicle;
   wherein a distance measuring system of the vehicle is operable to determine distance between the vehicle and the wall in front of the vehicle;
   wherein said light projecting device is operated responsive to determination that the wall in front of the vehicle is within a first threshold distance from the vehicle; and
   wherein said vehicular lighting system controls said light projecting device to project a stop alert responsive to determination that the vehicle is less than a second threshold distance to the wall that is less than the first threshold distance.

3. The vehicular lighting system of claim 2, wherein the distance measuring system comprises one of (i) a RADAR sensing system of the vehicle, (ii) a LIDAR sensing system of the vehicle and (iii) an ultrasonic sensing system of the vehicle.

4. The vehicular lighting system of claim 2, wherein the projected animated sequence of visual images is indicative of the determined distance.

5. The vehicular lighting system of claim 2, wherein animation of the projected animated sequence of visual images is responsive to the determined distance between the vehicle and the wall in front of the vehicle.

6. The vehicular lighting system of claim 2, wherein said light projecting device intermittently projects the animated sequence of visual images, and wherein the rate of projecting the animated sequence of visual images is responsive to the determined distance between the vehicle and the wall in front of the vehicle.

7. The vehicular lighting system of claim 2, wherein the projected animated sequence of visual images comprises a plurality of bars.

8. The vehicular lighting system of claim 7, wherein an amount of the bars that are filled in is responsive to the determined distance between the vehicle and the wall in front of the vehicle, and wherein more bars are filled in as the vehicle approaches the wall in front of the vehicle.

9. The vehicular lighting system of claim 7, wherein the projected animated sequence of visual images comprises a plurality of vertically oriented bars having different heights.

10. The vehicular lighting system of claim 9, wherein a first bar of the plurality of vertically oriented bars is filled when the determined distance is less than the first threshold distance and a second bar of the plurality of vertically oriented bars is filled when the determined distance is less than a third threshold distance, and wherein the second bar has a height greater than a height of the first bar and the third threshold distance is lower than the first threshold distance and greater than the second threshold distance.

11. The vehicular lighting system of claim 2, wherein said light projecting device comprises a laser projector.

12. The vehicular lighting system of claim 2, wherein said light projecting device comprises a matrix of light emitting diodes.

13. The vehicular lighting system of claim 12, wherein operation of said light emitting diodes illuminates a ground area in front of the vehicle.

14. The vehicular lighting system of claim 2, wherein said light projecting device comprises a microelectromechanical (MEM) light projector.

15. A vehicular lighting system, said vehicular lighting system comprising:
- a light projecting device disposed at each headlight of a vehicle equipped with said vehicular lighting system;
- wherein said light projecting device comprises a matrix of light emitting diodes;
- wherein said light projecting device is part of the respective headlight;
- wherein said light projecting device, when operated, projects a sequence of visual light patterns on a wall in front of the vehicle;
- wherein the projected sequence of visual light patterns is viewable at the wall by a driver of the vehicle;
- wherein presence of the wall in front of the vehicle is determined at least in part responsive to processing, via an image processor, image data captured by a camera disposed at the vehicle and having a field of view forward of the vehicle; and
- wherein said light projecting device is operated during a parking maneuver of the vehicle and responsive to determination, via image processing by the image processor of captured image data, that the vehicle is approaching the determined wall in front of the vehicle.

16. The vehicular lighting system of claim 15, wherein the sequence of visual light patterns projected by said light projecting device, when operated, comprises an animated sequence of visual light patterns.

17. The vehicular lighting system of claim 15, wherein operation of said light emitting diodes illuminates a ground area in front of the vehicle.

18. A vehicular lighting system, said vehicular lighting system comprising:
- a light projecting device disposed at each headlight of a vehicle equipped with said vehicular lighting system;
- wherein said light projecting device is part of the respective headlight;
- wherein said light projecting device, when operated, projects a sequence of visual light patterns on a wall in front of the vehicle;
- wherein presence of the wall in front of the vehicle is determined at least in part responsive to processing, via an image processor, image data captured by a camera disposed at the vehicle and having a field of view forward of the vehicle;
- wherein the projected sequence of visual light patterns is viewable at the wall by a driver of the vehicle; and
- wherein the visual light pattern projected by said light projecting device, when operated, changes as distance between the vehicle and the wall decreases.

19. The vehicular lighting system of claim 18, wherein said light projecting device is operated during a parking maneuver of the vehicle and responsive to determination, via image processing by the image processor of captured image data, that the vehicle is approaching the determined wall in front of the vehicle.

20. The vehicular lighting system of claim 18, wherein said light projecting device comprises a laser projector.

21. The vehicular lighting system of claim 18, wherein said light projecting device comprises a matrix of light emitting diodes.

22. The vehicular lighting system of claim 21, wherein operation of said light emitting diodes illuminates a ground area in front of the vehicle.

23. The vehicular lighting system of claim 18, wherein said light projecting device comprises a microelectromechanical (MEM) light projector.

\* \* \* \* \*